United States Patent
Gibson et al.

(10) Patent No.: US 8,977,680 B2
(45) Date of Patent: Mar. 10, 2015

(54) SYSTEMS AND METHODS FOR SHARED ACCESS TO GAMING ACCOUNTS

(75) Inventors: James Gibson, Henderson, NV (US); Bryan Allison, Henderson, NV (US); John Samuel Painter, Henderson, NV (US)

(73) Assignee: Vegas.com, Henderson, NV (US)

(*) Notice: Subject to any disclaimer, the term of this patent is extended or adjusted under 35 U.S.C. 154(b) by 134 days.

(21) Appl. No.: 13/365,110

(22) Filed: Feb. 2, 2012

(65) Prior Publication Data

US 2013/0204923 A1    Aug. 8, 2013

(51) Int. Cl.
G06F 15/16    (2006.01)

(52) U.S. Cl.
USPC .......................................... 709/203

(58) Field of Classification Search
None
See application file for complete search history.

(56) References Cited

U.S. PATENT DOCUMENTS

| | | | |
|---|---|---|---|
| 4,912,310 A | 3/1990 | Uemura et al. | |
| 5,867,588 A | 2/1999 | Marquardt | |
| 5,899,980 A | 5/1999 | Wilf et al. | |
| 5,970,469 A | 10/1999 | Scroggie et al. | |
| 6,408,281 B1 | 6/2002 | Shell et al. | |
| 6,629,591 B1 * | 10/2003 | Griswold et al. | 194/205 |
| 6,775,371 B2 | 8/2004 | Elsey et al. | |
| 6,824,066 B2 | 11/2004 | Weyant | |
| 6,876,979 B2 | 4/2005 | Ling | |
| 7,032,817 B2 | 4/2006 | Blank | |
| 7,127,236 B2 | 10/2006 | Khan et al. | |
| 7,174,029 B2 | 2/2007 | Agostinelli et al. | |
| 7,174,563 B1 | 2/2007 | Brownlie et al. | |
| 7,239,226 B2 | 7/2007 | Berardi et al. | |
| 7,296,282 B1 | 11/2007 | Koplar et al. | |
| 7,315,823 B2 | 1/2008 | Bröndrup | |
| 7,398,225 B2 | 7/2008 | Voltmer et al. | |
| 7,636,674 B2 | 12/2009 | Francis | |
| 7,703,673 B2 | 4/2010 | Buchheit et al. | |
| 7,815,506 B2 | 10/2010 | Franklin et al. | |
| 8,020,181 B2 | 9/2011 | Koplar et al. | |
| 8,052,518 B1 | 11/2011 | Kelly et al. | |
| 8,239,487 B1 | 8/2012 | Hoffman et al. | |
| 2002/0082076 A1 * | 6/2002 | Roser et al. | 463/25 |
| 2002/0112174 A1 | 8/2002 | Yager et al. | |
| 2002/0131565 A1 | 9/2002 | Scheuring et al. | |
| 2002/0151359 A1 * | 10/2002 | Rowe | 463/29 |
| 2003/0126013 A1 | 7/2003 | Shand | |
| 2003/0217002 A1 | 11/2003 | Enborg | |
| 2004/0167794 A1 | 8/2004 | Shostack et al. | |
| 2005/0049731 A1 * | 3/2005 | Dell | 700/91 |
| 2005/0080748 A1 | 4/2005 | Belobaba et al. | |
| 2005/0176507 A1 * | 8/2005 | Ephrati et al. | 463/39 |

(Continued)

OTHER PUBLICATIONS

Office Action mailed Aug. 8, 2011 for U.S. Appl. No. 12/208,236, filed Sep. 10, 2008 (36056/1.2).

(Continued)

*Primary Examiner* — Brian J Gillis
*Assistant Examiner* — Michael A Keller
(74) *Attorney, Agent, or Firm* — John R. Thompson; Stoel Rives LLP

(57) ABSTRACT

A web server provides a host website to receive user profile and financial information to establish user gaming accounts that are shared by a plurality of on-line gaming venues. Each gaming venue, operated by different entities, provides gaming activities on a respective website. The host website provides a plurality of links to the participating on-line gaming venues and each gaming venue has shared access to the same user gaming account to facilitate user participation.

17 Claims, 2 Drawing Sheets

(56) References Cited

U.S. PATENT DOCUMENTS

| | | | |
|---|---|---|---|
| 2005/0284930 A1 | 12/2005 | Hefner et al. | |
| 2006/0015404 A1 | 1/2006 | Tran | |
| 2006/0063587 A1* | 3/2006 | Manzo | 463/25 |
| 2006/0148567 A1* | 7/2006 | Kellerman et al. | 463/42 |
| 2006/0195331 A1 | 8/2006 | Goldthwaite et al. | |
| 2006/0277103 A1 | 12/2006 | Fujita et al. | |
| 2006/0287898 A1 | 12/2006 | Murashita et al. | |
| 2007/0055440 A1 | 3/2007 | Denker et al. | |
| 2007/0143155 A1 | 6/2007 | Whitsett et al. | |
| 2007/0173326 A1* | 7/2007 | Jennings et al. | 463/42 |
| 2007/0259709 A1 | 11/2007 | Kelly et al. | |
| 2007/0265920 A1 | 11/2007 | Bistriceanu et al. | |
| 2008/0040239 A1 | 2/2008 | Jacobi et al. | |
| 2008/0091482 A1 | 4/2008 | Whitsett et al. | |
| 2008/0224822 A1 | 9/2008 | Gelman et al. | |
| 2008/0254893 A1 | 10/2008 | Patel et al. | |
| 2008/0262862 A1* | 10/2008 | Chatenay | 705/1 |
| 2008/0274796 A1 | 11/2008 | Lube | |
| 2008/0300990 A1 | 12/2008 | Guiton et al. | |
| 2008/0306826 A1 | 12/2008 | Kramer et al. | |
| 2008/0311893 A1* | 12/2008 | Liu et al. | 455/414.2 |
| 2009/0131143 A1 | 5/2009 | Kelly et al. | |
| 2009/0156310 A1 | 6/2009 | Fargo | |
| 2009/0171988 A1 | 7/2009 | Kikin-Gil | |
| 2009/0177541 A1* | 7/2009 | Martel et al. | 705/14 |
| 2009/0216633 A1 | 8/2009 | Whitsett et al. | |
| 2009/0276292 A1 | 11/2009 | Inselberg | |
| 2009/0287570 A1 | 11/2009 | Adamousky et al. | |
| 2009/0292599 A1 | 11/2009 | Rampell et al. | |
| 2009/0313094 A1* | 12/2009 | Singh | 705/12 |
| 2010/0018046 A1 | 1/2010 | Pöllabauer | |
| 2010/0030578 A1 | 2/2010 | Siddique et al. | |
| 2010/0076862 A1 | 3/2010 | Lefkowitz | |
| 2010/0078475 A1 | 4/2010 | Lin et al. | |
| 2010/0082481 A1 | 4/2010 | Lin et al. | |
| 2010/0099485 A1 | 4/2010 | Sommer et al. | |
| 2010/0169188 A1 | 7/2010 | Buchheit et al. | |
| 2010/0179879 A1* | 7/2010 | Cunningham et al. | 705/14.71 |
| 2010/0250290 A1 | 9/2010 | Lefkowitz | |
| 2010/0260426 A1 | 10/2010 | Huang et al. | |
| 2011/0003634 A1* | 1/2011 | Manteris | 463/25 |
| 2011/0183762 A1* | 7/2011 | Topham et al. | 463/42 |
| 2011/0238503 A1 | 9/2011 | Naini | |
| 2011/0263318 A1* | 10/2011 | Agarwal et al. | 463/25 |
| 2011/0264474 A1 | 10/2011 | Lefkowitz | |
| 2011/0295693 A1 | 12/2011 | Clavin et al. | |
| 2012/0088570 A1* | 4/2012 | Schwartz | 463/25 |
| 2012/0089581 A1* | 4/2012 | Gupta et al. | 707/706 |
| 2012/0185310 A1 | 7/2012 | Greenspun | |
| 2012/0197692 A1* | 8/2012 | Ganz et al. | 705/14.1 |
| 2012/0270645 A1* | 10/2012 | Bortnik et al. | 463/29 |
| 2013/0080257 A1 | 3/2013 | Greenspun | |

OTHER PUBLICATIONS

Article entitled "Increase Web Sales: Convert Facebook Fans Into Customers," by Carrieanne Larmore, web page at http://www.suite101.com/content/e-commerce-strategies-convert-facebook-fans-into-cuto . . . , as available via the Internet and printed Jan. 3, 2011 (15 pgs.).

Office Action mailed Oct. 3, 2011 for U.S. Appl. No. 12/413,321, filed Mar. 27, 2009 (36056/1.3).

Office Action, mailed Dec. 14, 2011 for U.S. Appl. No. 13/178,997, filed Jul. 8, 2011 (36065/1.13).

Office Action for U.S. Appl. No. 13/007,959, filed Jan. 17, 2011, mailed Nov. 9, 2012.

Office Action for U.S. Appl. No. 13/681,142, filed Nov. 19, 2012, mailed Jan. 22, 2013.

Notice of Allowance from USPTO for U.S. Appl. No. 13/007,959 mailed May 14, 2013.

Final Office Action for U.S. Appl. No. 13/681,142, filed Nov. 19, 2012, and mailed from the USPTO on Jun. 19, 2013, 26 pgs. (36056/1.16).

Non-final Office Action for U.S. Appl. No. 13/681,142, filed Nov. 19, 2012, and mailed from the USPTO on Nov. 14, 2013, 18 pgs. (36056/1.16).

* cited by examiner

SYSTEMS AND METHODS FOR SHARED ACCESS TO GAMING ACCOUNTS

TECHNICAL FIELD

This disclosure relates to a system and method for providing shared access to user profiles and gaming accounts to facilitate on-line gaming.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION OF PREFERRED EMBODIMENTS

The disclosed systems and methods provide shared access to user profiles and gaming accounts to facilitate on-line interactive gaming participation. A host server allows users to establish user accounts which include profile, financial, and log-in information. Once the accounts are established, the accounts may be accessed by systems supporting and participating in the gaming platform.

Figure 1:
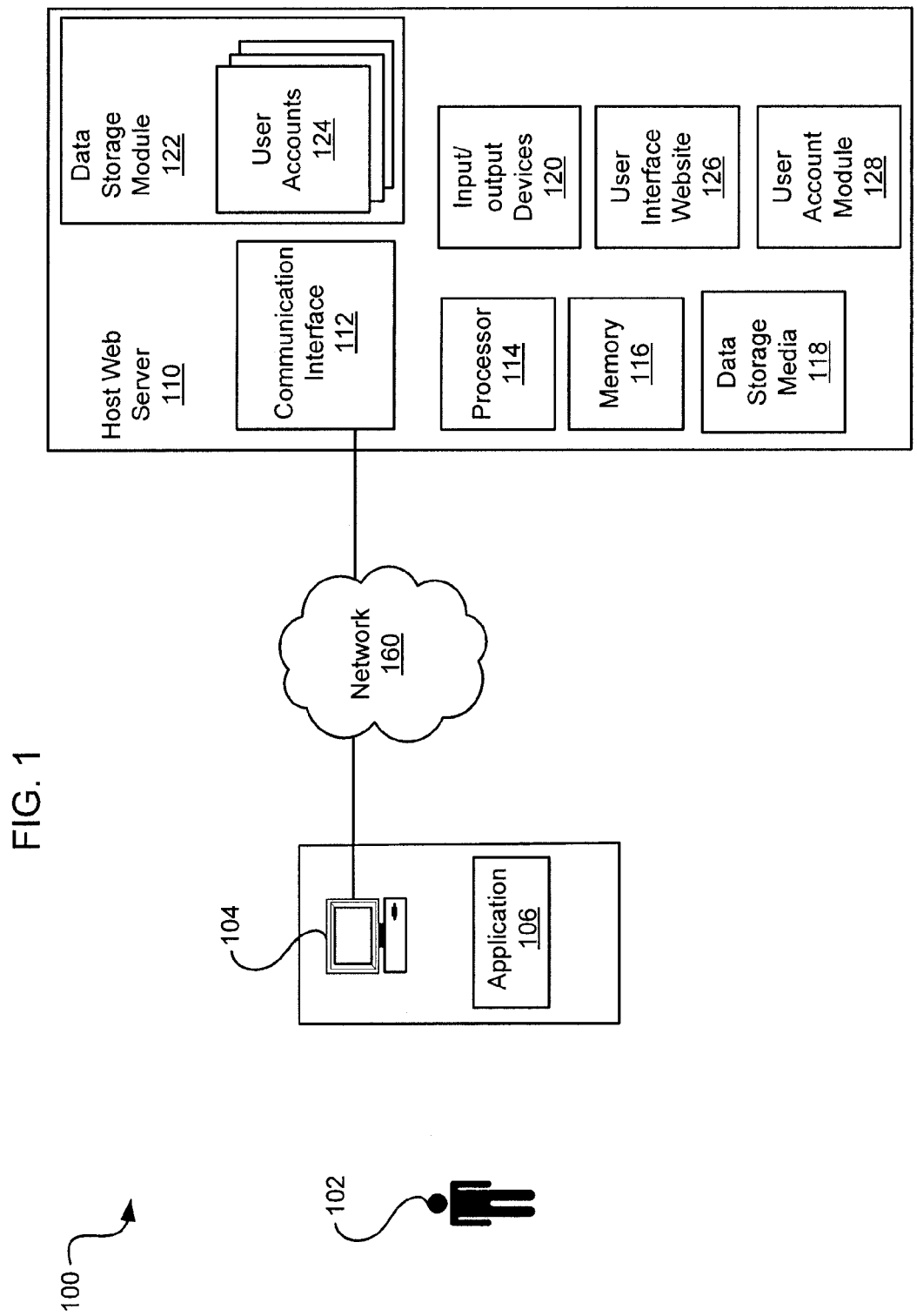
FIG. 1 is a block diagram of one embodiment of a system for providing shared access to user accounts including user profile information and financial information to facilitate on-line gaming.

FIG. 1 is a block diagram of one embodiment of a system 100 for providing on-line shared accounts for users of gaming web services. The gaming web services include a wide variety of on-line gambling activities with the incentive of winning money or other redeemable value as permitted by law. Users 102 may be communicatively coupled to a network 160 using respective computing devices 104, which may comprise any computing device known in the art including, but not limited to: a personal computing device (e.g., a personal computer), a portable computing device (e.g., a laptop computer, a notebook computer, or the like), a smart phone (IPhone®, Android®, Blackberry®, or the like), a personal digital assistant (PDA), a set top box (STB), a multi-media appliance, or the like. Each of the computing devices 104 may comprise a processor and a respective web application 106 to access and display content accessible through the network 160. As used herein, a web application refers to any application or process used to access content on a network. Accordingly, a web application may refer to a web browser application, such as Microsoft Internet Explorer®, Mozilla Firefox®, Google Chrome®, Apple Safari®, or the like. A web application may further refer to any other type of application that, although not principally directed to accessing/displaying network content as a web browser, is capable of accessing and/or displaying content from a network. For example, a word processor may be a web application in the sense that it provides network access features, such as an online help feature, access to online libraries (e.g., clip art libraries, etc.), and the like. Similarly, an online ordering/reservation application may act as a web application by interacting with network accessible storefront/reservation systems. An email client may be referred to as a web application in that it provides access to network data, such as email messages, network content referenced (e.g., linked) therein, and so on.

Web resource(s) and/or web services accessed by the application(s) 106 may comprise content formatted according to the HTML standard (or a related or like standard). The web resource(s) may be transmitted to the application 106 over the network 160 using the Hyper Text Transfer Protocol (HTTP) standard (or a related standard). However, although HTML content transferred via HTTP is discussed herein, the teachings of this disclosure should not be read as limited to any particular content format and/or communication protocol. As used herein, a web resource may refer to any content that is displayable by a web application 106 (e.g., content formatted according to the Hyper Text Markup Language (HTML)) standard, or a related standard) and/or a plug-in to the user agent (e.g., content that is displayable by a Flash® virtual machine, a Java® virtual machine, or the like). Accordingly, a web resource may comprise static and/or interactive (e.g., dynamic) text, imagery, audio, video, interface components (e.g., maps, configuration interfaces, etc.), games, editing tools, or the like. As used herein, a web service may refer to any service which is accessible via a network. Examples of web services include, but are not limited to a web site, a web server, an FTP service, a Telnet service, an online help application, an instant messaging service, an email server, a Simple Object Access Protocol (SOAP) service, a Web Service Description Language (WSDL) compliant service, or the like.

The network 160 may comprise any data communication network known in the art including, but not limited to: a transmission control protocol, Internet Protocol (TCP/IP) network, the Internet, a local area network (LAN), a wide area network (WAN), a virtual private network (VPN), a public switched telephone network (PSTN), a wireless network (e.g., IEEE 802.11a-g, Bluetooth, or the like), a combination of networks, or the like.

The users 102 may access a host web server 110 through the network 160. The host web server 110 may be communicatively coupled to the network 160 using a communication interface 112, which may comprise an Ethernet interface, a wireless communication interface, a PSTN interface, or the like. The host web server 110 may further comprise a processor 114, a memory 116, computer-readable data storage media 118, and/or one or more input/output devices 120, such as a keyboard, mouse, KVM, or the like.

The processor 114 may comprise any processing means known in the art, such as one or more Intel Core2 Duo® processors, one or more AMD Athlon® processors, and so on. Each of the one or more processors may comprise a plurality of processing cores. In some embodiments, the host web server 110 may comprise a plurality of processing modules (not shown), in a blade or similar configuration. Accordingly, the host web server 110 may comprise a plurality of computing devices (e.g., servers) operating in a cluster and/or load balancing configuration.

The memory 116 may comprise any volatile and/or non-volatile memory known in the art. The computer-readable storage media may comprise one or more discs (e.g., magnetic discs), optical media, distributed media (e.g., in a storage area network (SAN) or the like), or similar devices. The input/output devices may comprise one or more keyboards (not shown), pointing devices (not shown) (e.g., a mouse, track ball, or the like) displays (not shown), KVM connections, or the like.

The host web server 110 may further comprise a data storage module 122, which may comprise any memory and/or data storage means known in the art. The data storage module 122 may comprise one or more computer-readable storage media, such as one or more discs, optical media, distributed media (SAN), Flash memory, or the like. As will be discussed below, the data storage module 122 may be used to store user accounts 124 corresponding to the users 102.

The systems and methods disclosed herein may access various different storage locations for module and information storage. The storage locations include, but are not limited to cookie storage, Flash® storage, virtual machine storage, and the like. As used herein, virtual machine storage may be storage accessible via virtual machine or other plug-in application running in conjunction with the user agent. Flash® is one example of virtual machine storage. However, although Flash® storage is described herein, one skilled in the art would recognize that the teachings of this disclosure could be adapted for use with other virtual machine types, such as a Java® virtual machine, a Microsoft Silverlight® virtual machine, or the like.

The host web server 110 may comprise a user interface website 126 which may be stored on memory 116, data storage media 118, data storage module 122, or other computer-readable storage media of the host web server 110. The website 126 may be configured to provide information to the users 102 in a particular format and/or according to a particular protocol, such as HTTP, or in any other format capable of being consumed by the users 102 (e.g., capable of being read and/or displayed by the user computing devices 104 and rendered by the applications 106 of the respective users 102). The website 126 may be customized, meaning that the website 126 may be capable of tailoring the web resource(s) provided to the users 102 according to a "context" (e.g., as embodied by a user context) of the respective user 102.

The host web server 110 may include a user account module 128 which may be resident in whole or in part on the memory 116, data storage media 118, and/or data storage module 122. The user account module 128 allows a user 102 to log-in and set up user accounts for gaming across multiple on-line venues such as games offered on websites or for gaming with downloadable, executable applications. The user account module 128 may provide log-in capability for securely accessing a user account. User accounts each may include log-in information, user profile data, and financial data which may be stored in memory 116, data storage module 122, or other suitable computer readable medium. Log-in information includes a user name and password to uniquely identify the user 102. Setting up a user account further requires initial verifications of age and jurisdictional residence to confirm that the user 102 is of a legal age to participate and in a jurisdiction where participation is permitted. Age and residence may be verified by entry of government document information and confirmed with a respective database. For example, a user 102 may be required to enter in a driver license number as proof of age and residence and the license number may be verified by accessing the respective government database. In this manner, the user account module 128 verifies that a user is legally eligible, based on age and residence, to participate in gaming activities. The user account module 128 may take additional actions, as is known in the art, to provide multiple layers of verification to confirm that the user 102 is eligible to participate in gaming activities. Verification may take a matter of minutes so that a user 102 can establish a user account 124 in one on-line session, or verification may take hours or days in which case a user 102 may be notified of the account status at a later time.

In some jurisdictions, certain gaming activities may be allowed while others are prohibited which impacts the level of participation. As such, a user 102 may be legally eligible to play a limited number of games provided by a gaming venue. The user eligibility information may be stored in the user profile and this may include how the user eligibility was determined and whether the user 102 has limited eligibility. User eligibility may also be periodically reconfirmed. For example, a user 102 may be required every six months or year to reconfirm a place of residence to verify eligibility. If a user 102 fails to provide proper verification, then the user account 124 may be deactivated.

User profile information and financial information are then entered into the user account and thereafter then associated with the particular user account. The user account module 128 may employ various conventional security and encryption techniques to secure the user accounts.

User profile information may also include a locale of the user, demographics of the user, search terms submitted by the user, content accessed by the user on websites, other personal information, and the like. In particular, accessed content may include a wide variety of media content including social media such as video, audio, literature, and the like. User profile data may include a browsing history of user's preferences in social media which may be indicative a user's preferences in goods and services. User profile data may also include physical and physiological traits of a user such as age, race, health conditions, and the like. User profiles data may include user interaction data generated over different visits by a user 102 to the website 126 or affiliated websites.

Financial information reflects any form of monetary value or credit which is resident or accessible in a user account. The financial information may include credit card, debit card, and bank or savings and loan account information which may be charged or debited. The financial information may include deposited monetary value in various forms and may also include any play money, credit, points and the like which represents value for gaming. With the financial information, the user account may be considered as a virtual wallet for a user to employ in the use of gaming activities. In setting up an account, a user may make an initial deposit of monetary value and may make subsequent deposits as desired. Alternatively, the financial information may be used to debit or credit linked accounts to fund gaming activities. The financial information may further include pre-established limits on amounts that may be drawn. Although it is anticipated that users will establish an account through on-line access, a user may also establish a user account through other known methods such as by calling an operator who enters the information, mailing in information, visiting a physical location, and the like.

Access to the user accounts may be shared with other participating on-line venues such as companies operating on-line gaming activities which may be offered on websites or offered as downloadable, executable applications. In this manner, gaming venues will have access to user log-in, user profile, and financial information. Furthermore, a user may conveniently use the same log-in information for multiple gaming venues and manage financial information in a single account rather than using accounts for each gaming venue. In this manner, a user needs to finance a single account for gaming rather than maintaining and replenishing multiple accounts. Gaming venues include on-line websites or downloadable, executable applications which provide a variety of gambling activities requiring an initial investment with the potential of receiving an increased return. Thus, any gambling activity that allows on-line participation is within the scope of this disclosure. In addition to games of chance, the gaming activity may include any number of additional games, including puzzles, arcade-type games, strategy games, trivia games, and the like. Participation in the gaming activity may be enabled through conventional keyboard, mouse, and touch-screen interaction. The gaming activity is intended to provide an enjoyable experience for the user 102 and the gaming venue may direct or suggest gaming activities based on the user's profile. For example, users may be directed to different gaming activities based on user profile information which indicates preferences for certain gaming activities, i.e., Texas Hold 'Em versus Blackjack. The user profile information may further indicate a preference for the intensity or nature of the gaming experience such as casual gaming, social gaming, and/or real-money gaming.

Due to legal requirements, the gaming venues may only be available to users in certain states and jurisdictions. Furthermore, there may also be a legal requirement that the owning or supervising entity of the gaming venue also operate a physical casino, i.e. a "brick and mortar" store.

Access to a user account may be selective such as allowing viewing of all or some information, writing privileges to update user profile information, and writing privileges to update financial information. A user 102 may be allowed to view log-in information, select user profile information, and financial information. The host web server 110 may be entitled to view and update all information. Affiliated and/or participating gaming venues may be able to view and update select information based on assigned privileges. It can be appreciated that the host web server 110 will allocate viewing and writing privileges and update the same.

Figure 2:
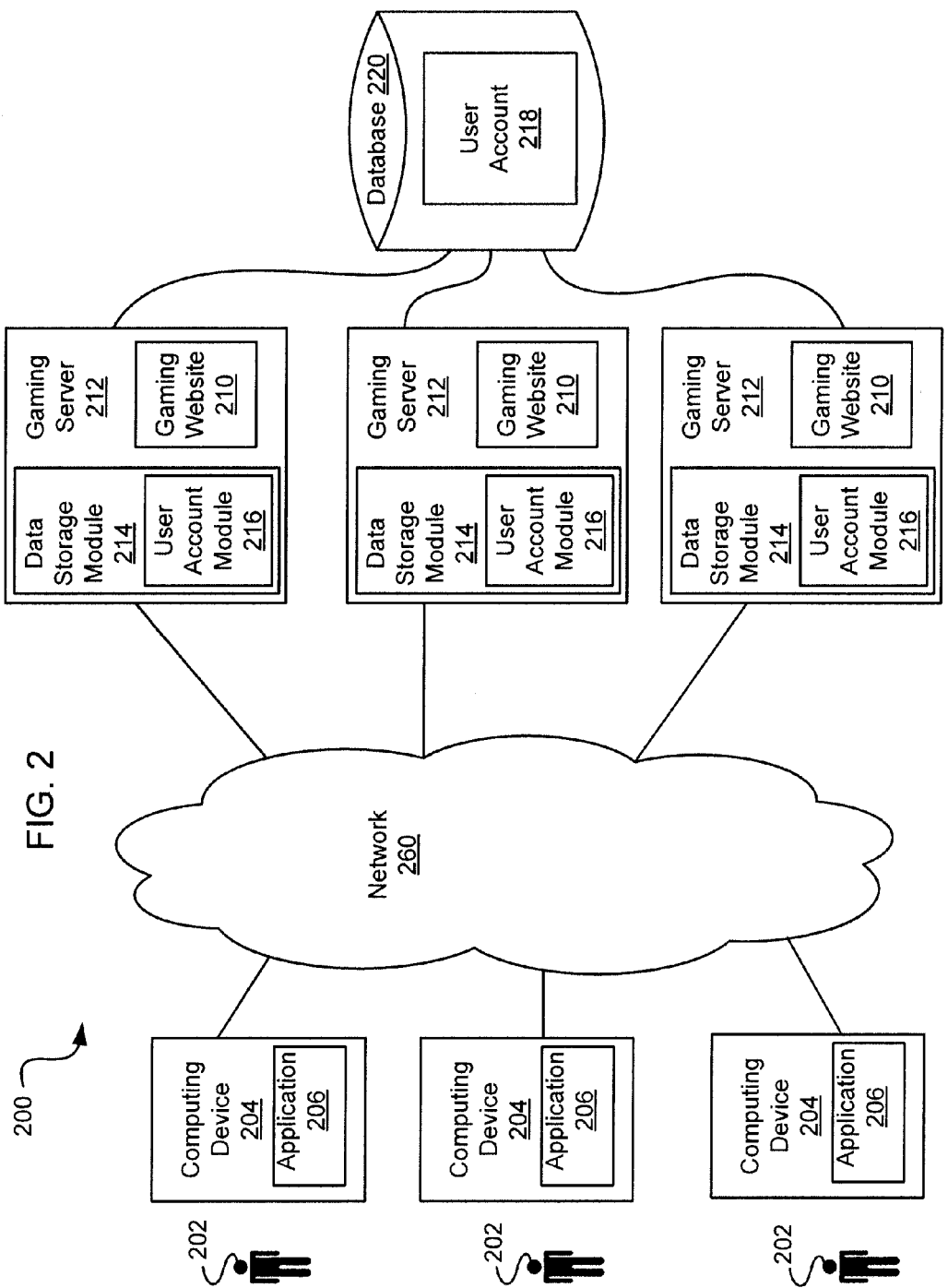
FIG. 2 is a block diagram of one embodiment of a system having a network of computers to provide shared access to user profiles and gaming accounts.

Referring to FIG. 2, a system 200 is shown with one or more users 202 that may be communicatively coupled to a network 260 via respective computing devices 204 comprising respective web applications 206. The users 202 may access one of a plurality of gaming websites 210 over the network 260 hosted on one or more gaming servers 212. The server 212 and corresponding website 210 together provide the gaming venue for the user to enjoy one or more gambling activities. The gaming venue may provide the gaming activity 210 partially or entirely on the website 210. Alternatively, the gaming venue may allow a user 202 to download an executable gaming application that is installed on the computing device 204. The gaming application may communicate with the gaming server to enable play, track spending activity, confirm user log-in information, and enable access to the user account. Thus, as used herein, the gaming venue includes the gaming server 212 and the gaming website 210, as well as a downloadable, gaming executable application that communicates with the gaming server 212. As stated previously, the gaming venue may be operated and/or owned by an entity that operates a physical casino in accordance with legal requirements. The entities providing the gaming venues may be affiliated or competing entities but nevertheless share access to the same user accounts.

The network 260 may include a transmission control protocol, Internet Protocol (TCP/IP) network, the Internet, a local area network (LAN), a wide area network (WAN), a virtual private network (VPN), a public switched telephone network (PSTN), a wireless network (e.g., IEEE 802.11a-g, Bluetooth, or the like), a combination of networks, or the like. Each server 212 may comprise one or more computing devices and include a processor (not shown), memory (not shown), data storage media (not shown), one or more communications interfaces (not shown), input/output devices (not shown), and the like. The computing devices 204, applications 206, websites 210 and servers 212 may be otherwise embodied as described in reference to FIG. 1.

A server 212 may include a data storage module 214, on which is stored a user account module 216. The user account module 216 is initiated when a user 202 accesses the website 210. The user account module 216 provides a log-in webpage which prompts for log-in information. The user account module 216 receives a user name and password and then accesses a corresponding user account 218. The user account 218 may include the information as described above and may be resident on the host server, affiliated server, or any other device with database storage and network access capability. The storage for the user accounts 218 is generically referred to herein as database 220. The database 220 may reference all databases for each gaming venue and the host web server 110. In one embodiment, the user account 218 is stored on multiple databases 220 and periodically updated or synchronized.

The server 212 is entitled to view the log-in information and confirms the log-in. At this point, the user 202 is able to access the financial resources of the user account 218 for gaming activities provided by the gaming venue. The gaming activity may be enabled through a downloaded, executable application on the computing device 204 or through an activity on the gaming website 210 which is rendered by the application 206. The gaming server 212 may have writing privileges to update the financial information to reflect gaming activity. User account information may be temporarily stored on the gaming server 212 and then updated on the database 220 after a user logs-off or at periodic intervals. The gaming server 212 may also access the user account 218 to conduct a financial transaction, such as credit card information to fund gaming activities.

After a user 202 concludes a session at a gaming venue, the user may log-off or be logged-off after terminating access to the gaming website 210. At a later time, the user 202 may access another gaming venue, or the same gaming venue, and log-in to the same user account 218 and have access to the same financial resources provided in the user account 218. In this manner, multiple gaming venues share access to the same user account 218, including the financial and user profile information.

A user 202 may also physically travel to a physical casino location operated and/or owned by an entity operating a participating gaming venue. At the property site, the user 202 or casino staff may access the user account 218, through the log-in information, to view financial information and user profile information. The financial information provided in the user account 218 may be used to pay for on-site goods and services, including gaming activities.

The physical casino may provide incentives, coupons, complimentary gifts, and the like for participating in the on-line gaming venue and for physically appearing at the casino. Indeed, offers, coupons, rewards, and the like, collectively referred to herein as incentive offers, that are redeemed at the physical casino may be presented at the gaming venue 212. The incentive offers may be prominently displayed as a discount, coupon, or full purchase value for a related good or service. The user 202 may select an incentive offer and have it deposited in the user account 218. For example, the incentive may be for a 20% discount for a hotel stay, free slot play, free drinks, or discounted live theater at the physical casino. The user 202 may select the incentive offer and this would be reflected in the user account 218. The incentive offer may then be redeemed when the user 202 visits the physical casino and the user's account is accessed such as at the front desk or at the concierge desk.

The incentive offers may be displayed next to the gaming activity on a webpage of the website 210 to encourage user selection. Thus, the incentive offer is displayed simultaneously with the operation of the activity. The incentive offer may be displayed in a variety of graphical formats and multiple incentive offers may be displayed sequentially to a user 202. The incentive offer may also have an expiration date for redemption which may be prominently displayed on the offer.

As such, a user 102 would be required to redeem the offer within the pre-established time.

Incentive offers may be provided on the basis of length of time of user participation at the gaming venue or on the basis of monetary amounts used in gaming. Incentive offers may also be provided freely or purchased using the financial information from a user account 218. Having purchased an incentive offer, the user 202 is more likely to follow through on a visit to a physical casino. Incentive offers may also be provided upon certain events occurring during gaming such as after a substantial win or loss.

The good or service related to the incentive offer may be selected based on the user profile information to increase the likelihood of selection of the offer. Thus, the good or service may be based on likely preferences as determined by a user's age, selection of media content, travel reservation history, nationality, income bracket, education, residential address, work address, or any one of a number of characteristics. The user preferences may also be determined by a user 202 directly indicating certain preferences such as by completing a survey.

One or more of the gaming websites 210 may monitor and record user interactions which may then be used to update the user profile information on the user account 218. Alternatively, a gaming venue may opt to maintain and update an independent user profile.

In practice, a user 202 may access the host web server 110 and view advertisements for various gaming venues. The gaming venues may provide incentive offers to participate in gaming activities at their respective websites or through a downloadable, executable gaming application such as $50 free play, $20 cash back, and so forth. A user 202 may select a gaming venue and then would be required to set up a user account 218. Alternatively, the user account 218 may be set up before selecting a gaming venue. Upon selecting a gaming venue with an initial incentive offer, the incentive offer may be deposited in the user account 218. Establishing the user account 218 is conducted as discussed in reference to FIG. 1. The host web server 110 may oversee all operations in initially setting up the user account 218 that will then be shared with the different gaming venues. Accordingly, the gaming venues rely on the host web server 110 to confirm that the legal and financial requirements are met to participate in gaming activities. In turn, the host web server 110 relies on the gaming venues to operate the on-line gaming. On-line gaming may be provided entirely or partially through the gaming website 210 operating with the application 206 and/or through a downloadable, executable gaming application that is installed on the computing device 204. In this manner, the host web server 110 serves to bring the users 202 to the gaming venues by creating ease of use for users 202 as they move from venue to venue.

Once having created a user account 218, the user 202 can visit all participating gaming venues and access the same account 218. The user 202 does not need to set up a new account, reenter information, and undergo verification again. A user 202 may log-in at the host web server 110 and then follow a link to a gaming venue or the user 202 may proceed directly to a gaming venue and log-in at that website 210. A user 202 may visit a gaming venue by entering a gaming website 210 and then selecting an option to download an executable gaming application. After downloading the gaming application on the computing device 204, the executable gaming application is installed and the user 202 thereafter may interface with the installed gaming application rather than the application 206. During game play, the executable gaming application installed on the computing device 204 may communicate with the gaming server 212 which in turn communicates with the database 220 to access the user account and confirm user eligibility and financial ability to participate. User eligibility includes verification of the user's identity through a log-in process and that the user is legally eligible to participate in games of chance with financial reward.

In one embodiment, the host web server 110 may track total spending activity across all gaming venues. This may be reflected in the financial information of the user account 218. The spending activity may also be broken down by gaming venues, gaming activities, date, and even time. The host web server 110 may provide incentive rewards and offers based on total spending activity. The incentive offers may include complimentary or discounted travel offers, free play offers or discounts on gaming activities, and additional goods and services to reward a user for substantial spending activity.

Each gaming venue may also track users 202 visiting their respective websites 210 and/or downloading executable gaming applications through the systems 100, 200 described herein. Gaming venues may compensate the host web server 110 based on the number of visiting and/or participating users 202 and/or based on spending activity. Gaming venues may agree to provide fees for links on the user interface website 126, fees for users 102 visiting the gaming website, and fees based on gaming and spending activity. However, gaming venues may not be permitted to view spending activity for other gaming venues. In one embodiment, the user accounts 218 are stored in a database 220 controlled exclusively by the host web server 110. The host web server 110 allows gaming venues limited viewing and updating of user accounts 218 according to previously determined guidelines. The host web server 110 may retain confidentiality on some user profile information such as any information that indicates a gaming venue preference.

When a user 202 logs-in at the host web server 110, the user 202 may be permitted to view limited user account information as well. A user 202 may not be able to view all user account information as desired by the entity operating the host web server 110. A user 202 may select a gaming venue, log-in at the host web server 110, and then proceed to the venue. The gaming server 212 accesses the user account 218, confirms eligibility, and then populates the appropriate player fields. The user 202 may then participate in the desired gaming activities offered at the gaming venue.

The systems 100, 200 described herein may be outsourced or licensed partially or in their entirety. The architecture and infrastructure for the host web server 110 and the gaming server 212 may also be provided to a customer and marketed under the customer's private label.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product, including a computer-readable non-transitory and tangible medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of this disclosure.

What is claimed is:

1. A computer system to perform a method of establishing and sharing a shared user gaming account for on-line gaming activities, comprising:
    a processor; and
    a computer-readable non-transitory storage medium comprising computer executable instruction code to direct the processor to,
    provide a host website with a plurality of links to corresponding on-line gaming venues operated by different entities,
    receive, through the host website, user-entered profile and financial information corresponding to a user to generate and store a shared user gaming account specific to the user,
    receive, through the host website, a user name and password specific to the user and shared user gaming account,
    enable the user to log-in to the corresponding shared user gaming account by entering the user name and password,
    enable each on-line gaming venue shared access to the shared user gaming account to confirm user eligibility to participate in gambling and to fund gaming activities on the respective on-line gaming venue, wherein the user eligibility to participate in gambling is at least partially based on a residence address associated with the user,
    enable each on-line gaming venue, and at least one physical casino venue affiliated with one of the on-line gaming venues, to update profile information and financial information of the user in the shared user gaming account in response to gaming activity conducted at a respective on-line gaming venue,
    track spending activity of the shared user gaming account associated with at least one on-line gaming venue,
    enable at least one of the on-line gaming venues to provide an incentive offer to incentivize a user to visit the affiliated physical casino venue, wherein the incentive offer is at least partially based on the tracked spending activity, and
    enable the user to log-in to a website of each of the on-line gaming venues by entering the user name and password associated with the shared user gaming account.

2. The computer system of claim 1, wherein the computer executable instruction code further directs the processor to store the user gaming account in a database in electrical communication with a server.

3. The computer system of claim 1, wherein the computer executable instruction code further directs the processor to enable each on-line gaming venue to view spending activity corresponding to the respective on-line gaming venue.

4. The computer system of claim 1, wherein the computer executable instruction code further directs the processor to generate an incentive offer for the user specific to an on-line gaming venue and based on the spending activity at the on-line gaming venue.

5. The computer system of claim 1, wherein the computer executable instruction code further directs the processor to display incentive offers adjacent to the on-line gaming venue links and corresponding to the respective on-line gaming venues.

6. The computer system of claim 1, wherein the computer executable instruction code further directs the processor to confirm user legal eligibility to participate in gambling based on the user-entered profile information.

7. The computer system of claim 1, wherein the computer executable instruction code further directs the processor to confirm user ability to fund gaming activities based on the financial information.

8. The computer system of claim 1, wherein the on-line gaming venue provides an option to download an executable gaming application to enable one or more gaming activities.

9. A computer-readable non-transitory storage medium comprising computer readable instruction code for performing a method of establishing and sharing a shared user gaming account for on-line gaming activities, the method comprising:
    providing a host website with a plurality of links to corresponding on-line gaming venues operated by different entities,
    receiving, through the host website, user-entered profile and financial information corresponding to a user to generate and store a shared user gaming account specific to the user,
    receiving, through the host website, a user name and password specific to the user and user gaming account,
    enabling the user to log-in to the corresponding shared user gaming account by entering the user name and password, enabling each on-line gaming venue shared access to the shared user gaming account to confirm user eligibility to participate in gambling and to fund gaming activities on the respective on-line gaming venue, wherein the user eligibility to participate in gambling is at least partially based on a residence address associated with the user, enabling each on-line gaming venue, and at least one physical casino venue affiliated with one of the on-line gaming venues, to update profile information and financial information of the user in the shared user gaming account in response to gaming activity conducted at a respective on-line gaming venue, tracking spending activity of the shared user gaming account associated with at least one on-line gaming venue, enabling at least one of the on-line gaming venues to provide an incentive offer to incentivize a user to visit the affiliated physical casino venue, wherein the incentive offer is at least partially based on the tracked spending activity, and enabling the user to log-in at a website of each of the on-line gaming venues by entering the user name and password associated with the shared user gaming account.

10. The computer-readable, non-transitory storage medium of claim 9, wherein the method further comprises storing the user gaming account in a database in electrical communication with a server.

11. The computer-readable, non-transitory storage medium of claim 9, wherein the method further comprises enabling each on-line gaming venue to view spending activity corresponding to the respective on-line gaming venue.

12. The computer-readable, non-transitory storage medium of claim 9, wherein the method further comprises generating an incentive offer for the user specific to an on-line gaming venue and based on the spending activity at the on-line gaming venue.

13. The computer-readable, non-transitory storage medium of claim 9, wherein the method further comprises displaying incentive offers adjacent to the on-line gaming venue links and corresponding to the respective on-line gaming venues.

14. The computer-readable, non-transitory storage medium of claim 9, wherein the method further comprises confirming user legal eligibility to participate in gambling based on the user-entered profile information.

15. The computer-readable, non-transitory storage medium of claim 9, wherein the method further comprises confirming user ability to fund gaming activities based on the financial information.

16. The computer-readable, non-transitory storage medium of claim 9, wherein the on-line gaming venue provides an option to download an executable gaming location to enable one or more gaming activities.

17. A computer system to perform a method of establishing and sharing a shared user gaming account for on-line gaming activities, comprising:

a processor; and a computer-readable non-transitory storage medium comprising computer executable instruction code to direct the processor to, receive, through the host website, user-entered profile and financial information corresponding to a user to generate and store a shared user gaming account specific to the user, receive, through the host website, a user name and password specific to the user and the shared user gaming account, enable the user to log-in to the corresponding shared user gaming account by entering the user name and password in response to gaming activity conducted at the respective on-line gaming venue, and enable each on-line gaming venue shared access to the shared user gaming account to confirm user eligibility to participate in gambling and to fund gaming activities on the respective on-line gaming venue, wherein the user eligibility to participate in gambling is at least partially based on a residence address associated with the user, track spending activity of the shared user gaming account associated with at least one on-line gaming venue, enable at least one of the on-line gaming venues to provide an incentive offer to incentivize a user to visit an affiliated physical casino venue, wherein the incentive offer is at least partially based on the tracked spending activity, and to enable each on-line gaming venue, and at least one affiliated physical casino venue, to update profile and financial information in the shared user gaming account.

* * * * *